United States Patent [19]

Gyori

[11] 4,214,171

[45] Jul. 22, 1980

[54] PLURAL PHASE PULSED POWER SUPPLY

[75] Inventor: Robert P. Gyori, Studio City, Calif.

[73] Assignee: De luxe General, Incorporated, Los Angeles, Calif.

[21] Appl. No.: 882,291

[22] Filed: Feb. 27, 1978

Related U.S. Application Data

[63] Continuation of Ser. No. 742,809, Nov. 18, 1976, abandoned.

[51] Int. Cl.[2] .............................................. G05B 13/02

[52] U.S. Cl. ........................................ 307/39; 307/41; 307/13

[58] Field of Search ........................ 307/14, 31, 38, 40, 307/234, 32, 41, 13, 39; 318/85; 328/62, 63, 70, 71; 355/35, 37, 38

[56] References Cited

U.S. PATENT DOCUMENTS

| | | | |
|---|---|---|---|
| 3,258,613 | 6/1966 | Felcheck | 307/38 UX |
| 4,034,232 | 7/1977 | LaVenture | 307/32 |
| 4,068,943 | 1/1978 | Gyori | 355/38 |

*Primary Examiner*—L. T. Hix
*Assistant Examiner*—S. D. Schreyer
*Attorney, Agent, or Firm*—Harry R. Lubcke

[57] ABSTRACT

A method and apparatus for supplying electrical power to plural phased loads from a single power source at staggered times, whereby the maximum energy demand upon the power source is reduced. A phase-divider creates synchronizing pulses defining the start of each power pulse. Plural pulse-width modulators are provided with analog information as to the amount of power to be supplied to each phase load and the width of the power pulse to that load is adjusted accordingly.

12 Claims, 3 Drawing Figures

PLURAL PHASE PULSED POWER SUPPLY

This is a continuation of application, Ser. No. 742,809, filed Nov. 18, 1976, now abandoned.

BACKGROUND OF THE INVENTION

The simple pulse type power supply is known. It is a single phase device in which full power or no power is supplied to a load depending upon the part of a cycle of operation that is being instantaneously considered.

Plural phase power has been supplied to a pair of fluorescent lamps that illuminate a common area for the purpose of reducing visual flicker. Usually, an all-alternating-current apparatus has been used and transformer means has been employed to split the phase of a single-phase alternating-current source, or of a three-phase alternating-current source, to convert it to two-phase for supplying the two fluorescent lamps.

SUMMARY OF THE INVENTION

The requirement that plural phase electrical loads be supplied with electric power that is regulated in amplitude by circumstances peculiar to each load is accomplished herein by the method of forming control pulses at unique times and individually altering the duration of power-supplying pulses. Each of the power-supplying pulses start at the time of the start of the corresponding control pulses, but the power-supplying pulses are of brief duration where a small magnitude of power is to be supplied to the load, and are of long duration where a large magnitude of power is to be supplied to the load.

An oscillator, typically of the square-wave type, energizes a phase-divider, which latter provides plural series of synchronizing pulses at mutually unique times. Individual pulse-width modulators have synchronized leading edges. Individual control integrated circuit charge devices determine the desired pulse width for each phase load to give the amplitude of power required by that load according to selected criteria A single, typically direct-current, source of power provides the basic power to energize the several loads. The staggered phase of the power pulses reduces the peak power required inversely according to the plurality of loads that are powered.

A feedback circuit may be employed to sense the energization of each phase load and to accordingly alter the performance of the pulse-width modulator according to any selected regimen.

DESCRIPTION OF THE PREFERRED EMBODIMENTS

Figure 1:
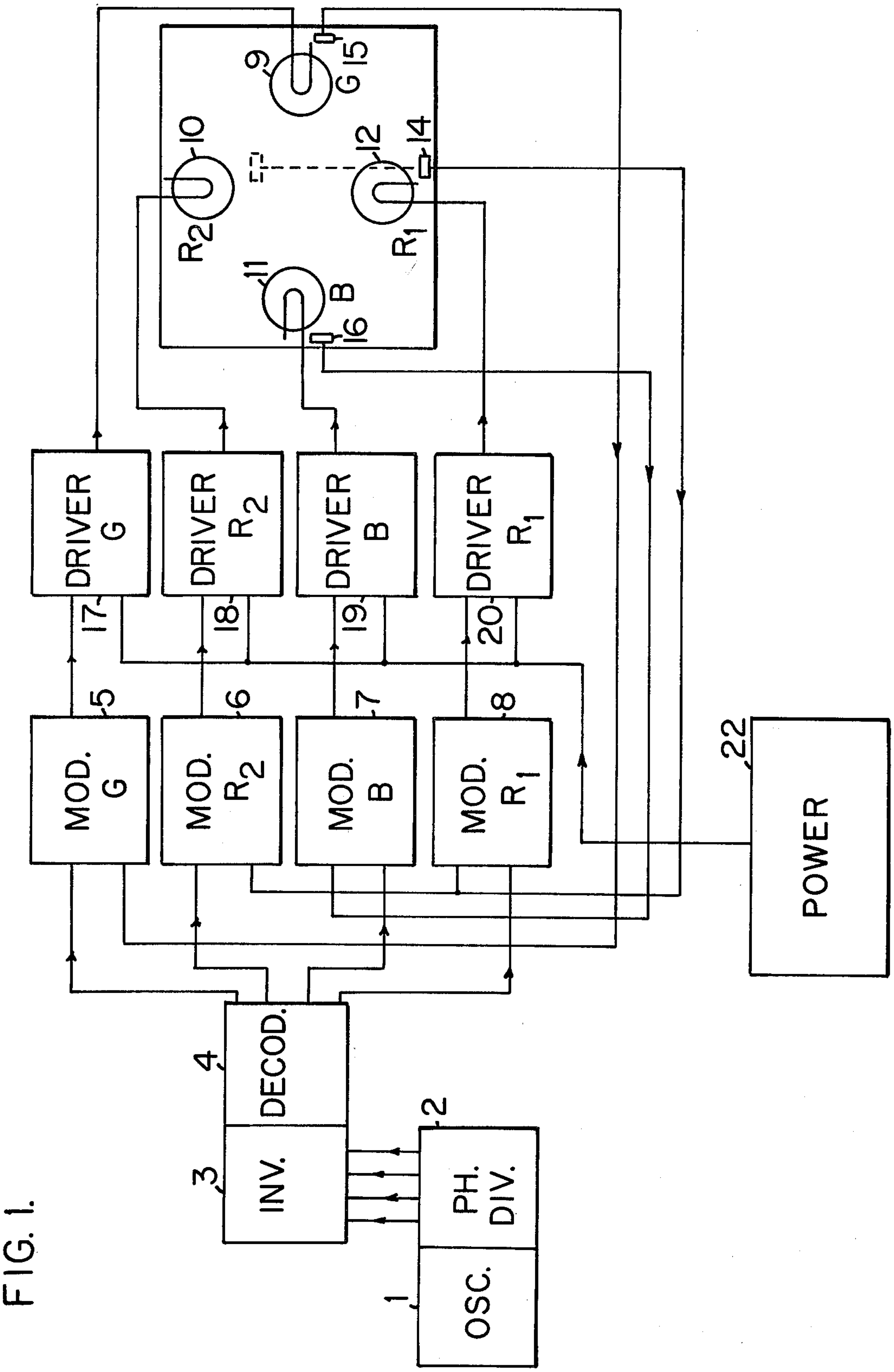
FIG. 1 is a block diagram for the plural phase pulsed power supply according to this invention, in which the plurality of phases and separate phase electrical loads is four.

In FIG. 1 numeral 1 identifies an electrical oscillator, or electric oscillatory means, that provides a continuous series of timing pulses to actuate the remainder of the power supply device. The example shown in FIG. 1 provides four phase power. Four differently timed series of pulses thus emanate from phase-divider means 2 of the oscillator entity.

These separately enter inverter 3, where the polarity of each series of pulses is inverted. The inverted series of pulses are then separately entered into decoder 4. From the decoder four series of pulses emerge, each series having only half as many pulses as originally produced; there being one pulse skipped between each pulse transmitted.

Each of these species passes into a separate pulse-width modulator means, as 5, 6, 7 and 8. An analog level of control potential also enters each of these modulators, the level being pertinent to the level of power that is to be supplied to each phase load.

In FIG. 1 the loads are shown as separate lamps 9, 10, 11 and 12 in a lamphouse, such as is disclosed in copending U.S. patent applications entitled, "Additive Color Printing Method and Apparatus", Gyori and Tullio, Ser. No. 703,735, filed July 9, 1976; and "Additive Color Printer Control", Gyori, Ser. No. 715,610, filed Aug. 18, 1976 and No. 4,068,943, issued Jan. 17, 1978, respectively.

However, the phase loads may operate only one device, such as a four-phase motor, rotary or stepping or any number of pluralphase loads, particularly where control of the power supplied to any one phase is to be separately controlled, an unusual aspect.

In the application of this power supply to the device of the recited patent applications, the luminous outputs of the lamps are monitored by photo-electric transducers 14, 15 and 16; also to be characterized as control means. There is one transducer for each of the colors red, green and blue, this being arranged by suitable filters for the lamps and the transducers.

The monitored values may be compared electrically with a set of selected values and the differences passed on to the pulse-width modulators, as set forth in the patent applications. Alternately, a transducer may be separately provided for each lamp, there then being four transducers. Further, equivalent sensors may be provided for other types of phase loads and the sensor outputs fed back for power control.

Lamp driver means 17, 18, 19 and 20 of FIG. 1 receive the individually adjusted pulse widths from corresponding modulators 5, 6, 7 and 8, respectively; also power at a uniform voltage from power supply 22. The latter may be the known a.c. to d.c. power supply, with smoothing filter. The lamp drivers are essentially power transistors with auxiliary transistors to effect required control of the power transistors.

The electrical output from each lamp driver is connected to the corresponding lamp for the controlled energization of each.

Figure 2:
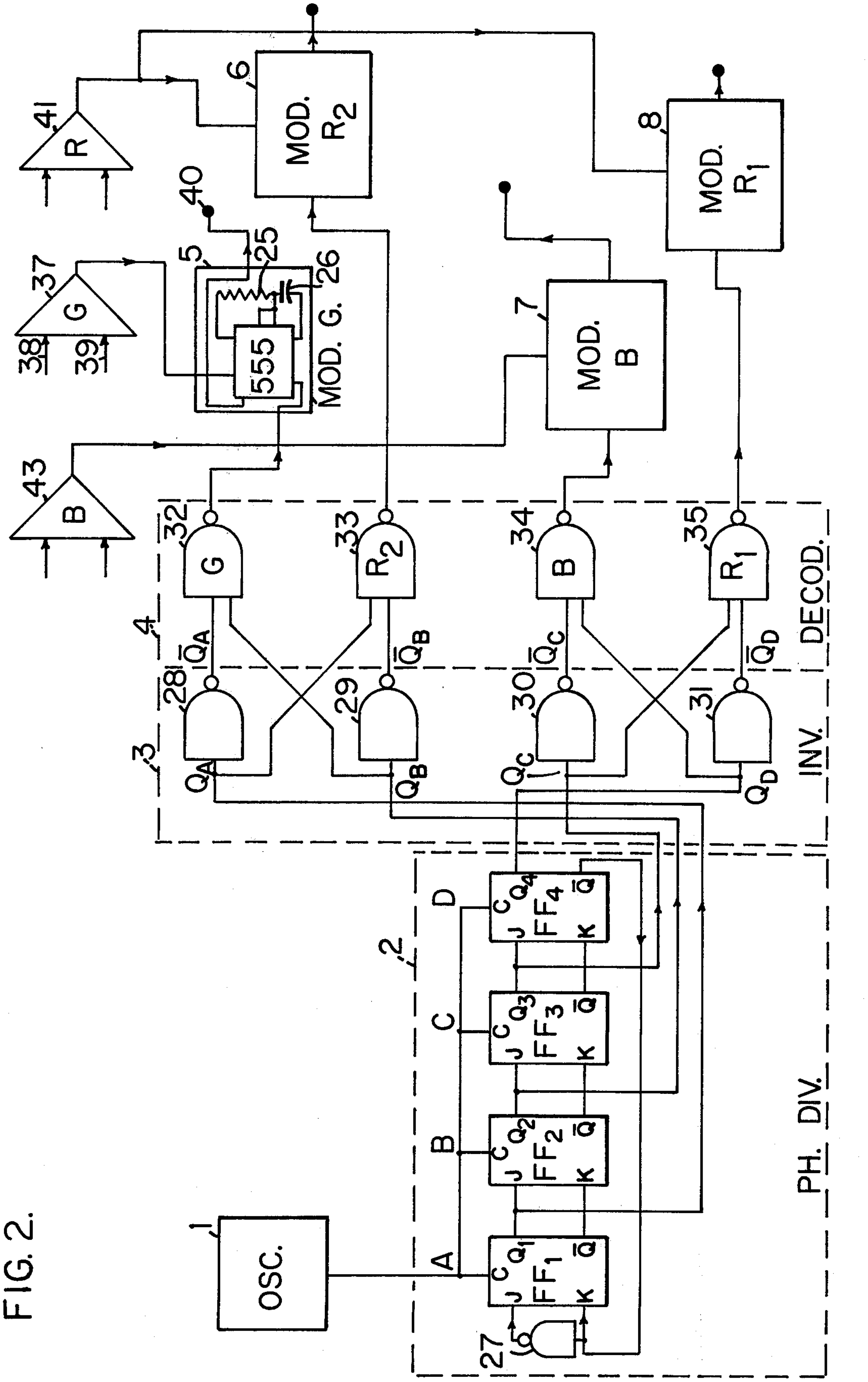
FIG. 2 is a schematic diagram following the structure of FIG. 1.

FIG. 2 shows the essential details of the plural phase power supply shown in block diagram form in FIG. 1.

Oscillator 1 is comprised of an integrated circuit (IC), which may be a type 555 IC with two external resistors and one external capacitor to provide a square-wave oscillator having an oscillation frequency of the order of 6,000 hertz.

This oscillation acts as a clock frequency for the phase divider means, or ring counter, 2. The output frequency of the ring counter is one-eighth of the oscillator frequency, or approximately 760 hertz, for the four flip-flop embodiment illustrated. Should a three-phase embodiment be desired, three flip-flops are employed and the clock frequency may be decreased by one-fourth.

The four flip-flop embodiment may be formed using a type 9300 IC. Between the flip-flops A,B,C,D ($FF_1$ thru $FF_4$), each Q output is connected to the next J input, and each $\overline{Q}$ output is connected to the next K input. The last $\overline{Q}$ output is connected to the first K input, but also through inverter 27 to the J input. This gives the inverted connection that results in only eight combinations in the code. The oscillator clock is fed to each clock terminal of flip-flops $FF_1$ through $FF_4$.

An output is taken from each Q terminal and is passed to separate inverters 28 through 31 that are within generic inverter 3. In each instance the Q input becomes a $\overline{Q}$ output. For example, the $Q_A$ input becomes $\overline{Q}_A$ output. These NAND gates may be a part of a type 964 IC.

Decoder 4 is comprised of four two-input NAND gates 32 through 35. The cross-connections from the inverters to the decoders gives the code required.

Specifically, decoder 32 receives a $\overline{Q}_A$ and a $Q_B$ input; decoder 33 receives a $\overline{Q}_B$ and a $Q_A$ input; decoder 34 receives a $\overline{Q}_C$ and a $Q_D$ input; and decoder 35 receives a $\overline{Q}_D$ and a $Q_C$ input.

The functioning of the decoder, thus connected, gives the following truth table:

| | A | B | C | D |
|---|---|---|---|---|
| * 1 = $\overline{A}\,\overline{D}$ | 0 | 0 | 0 | 0 |
| 2 = $A\,\overline{B}$ | 1 | 0 | 0 | 0 |
| * 3 = $B\,\overline{C}$ | 1 | 1 | 0 | 0 |
| 4 = $C\,\overline{D}$ | 1 | 1 | 1 | 0 |
| * 5 = A D | 1 | 1 | 1 | 1 |
| 6 = $\overline{A}\,B$ | 0 | 1 | 1 | 1 |
| * 7 = $\overline{B}\,C$ | 0 | 0 | 1 | 1 |
| 8 = $\overline{C}\,D$ | 0 | 0 | 0 | 1 |

What is wanted for actuating the pulse width modulators 5 through 8 is a series of four time-interval spaced pulses.

These are obtained from decoder 4 by providing a unique output for the combinations designated by * in the truth table; i.e., states 1, 3, 5 and 7.

The decoder is of the four two-input type. This simplification is possible because of the reversal of the output to input from $FF_4$ to $FF_1$ and because of the use of inverter section 3. If the inverter was omitted proper logic could be supplied, but a decoder of the four four-input type would be required.

Decoder 32 is connected to pulse-width modulator 5. In the example of the previously mentioned patent applications where the several loads are incandescent lamps provided with color filters to give component colors for illumination in an additive color printer, pulse-width modulator 5 is the "green" one. The decoder to modulator connection conveys what may be termed a synchronizing pulse; i.e., the timing for the start of the pulse-width pulse.

Pulse-width modulator 5 may be a 555 IC with an external circuit comprised of one resistor and one capacitor. In a specific example the resistor is connected between terminals (8) and (7) of the I.C. and has a resistance of 22,000 ohms, and the capacitor is connected between terminal (7) and ground and has a capacitance of 0.02 microfarads.

Should the synchronizing pulse frequency be changed for a different design both the resistor and capacitor values are changed in proportion to maintain the same relationship, since that relationship is significant in the over-all determination of the pulse duration.

The resistor is 25 and the capacitor is 26 in FIG. 2.

As schematically represented in FIG. 1, modulator 5 is also provided with an analog input that determines how long the pulse duration will be for a specific operating condition. When the operating condition changes, of course, the pulse duration also changes; typically, to bring the operating condition back to a predetermined norm.

The value of the analog input is determined by the power required to operate the load involved. In the color printer application described in the patent applications previously mentioned, the spectral composition of the "white" light desired for a given printing is set into the control apparatus. The response of the photo-electric transducer monitoring a given color component lamp is compared electrically with the set value and the difference becomes the value of the analog input.

The analog input normally has a voltage value in the range of from 0 to 5 volts of positive polarity. This amplitude is determined for each operating condition in comparator 37 of FIG. 2, herein. Continuing the prior application, two inputs enter the comparator, an output from a digital to analog converter at input 38 and an output from a corresponding photo-electric transducer 15 at input 39. The former input is the pre-determined criterion, and the latter is the intensity of the green component of the white light.

The output of modulator 5 passes to output terminal 40, and thence to lamp driver 17 of FIG. 1 in the use for the power supply that has been postulated.

Figure 3:
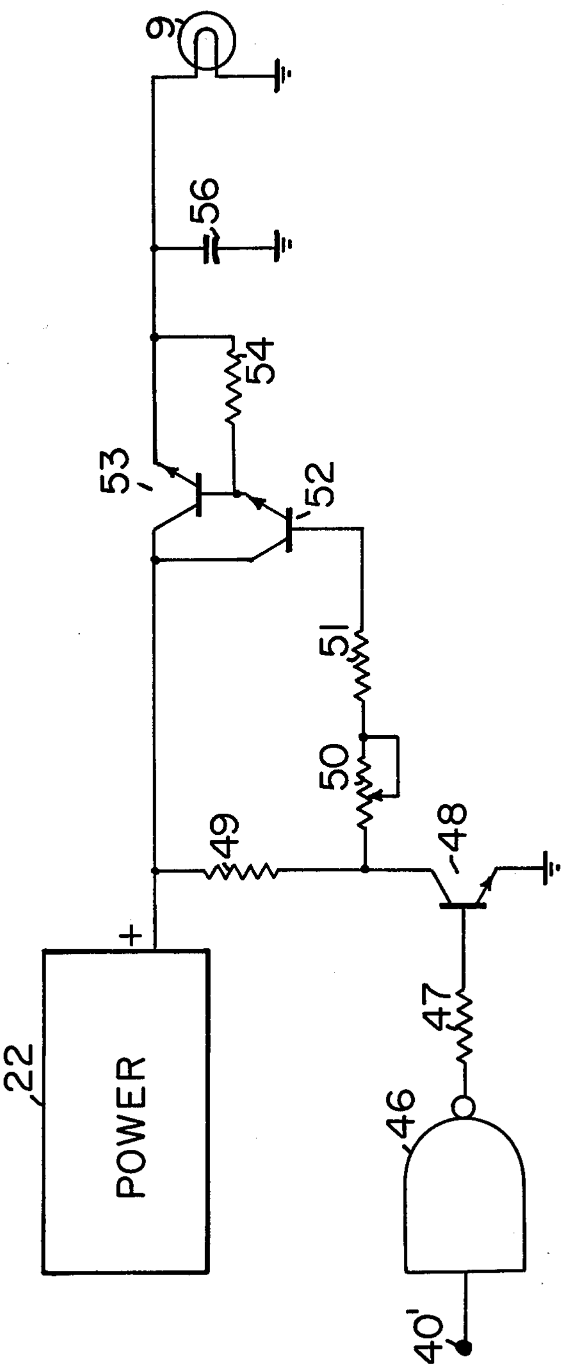
FIG. 3 details a driver circuit, from the output of a pulse-width modulator to a phase load.

The detailed schematic circuit of driver 17 is given in FIG. 3.

The electrical output of modulator 5 is a series of pulses, and width of each which depends upon the amount of power that is to be supplied to that phase load. When only a small amount of power is to be supplied the pulse is of short duration, with a long dwell time at zero axis thereafter until the next pulse. When a large amount of power is to be supplied the pulse is of long duration, ceasing only shortly before the start of the next pulse.

The circuits for the remaining phases are duplicates of that described above. Decoder 33 is connected to pulse-width modulator 6 to determine the start of the pulse-width pulse for that element; which start is delayed in time with respect to the pulse for modulator 5. Comparator 41 is also provided with inputs from the digital to analog converter that represents the desired pre-set value of power for this phase and from the feedback response of the red 2 transducer 14. Comparator 41 is connected to modulator 6.

In the present example two red light emitting lamps are used to obtain a desired illumination response level for this color.

Similarly, decoder 34 is connected to pulse-width modulator 7. Comparator 43 is similarly provided with two inputs and is connected to modulator 7 to determine the pulse duration thereof.

Further, decoder 35 is connected to pulse-width modulator 8. The "red" comparator 41 is also connected to modulator 8, having previously been described as connected to modulator 6. These embrace the two red lamps 10 and 12 of FIG. 1. The timing of the power pulse is different for the two modulators, but the level of power is the same, being sensed by transducer 14.

In another application of this invention, should there be a requirement that the fourth phase be independently controlled, this can be accomplished by the addition of one more comparator that is provided with independent inputs and gives an output only to the fourth phase modulator 8.

It will be understood that should a three phase power supply be desired, the same can be embodied by reducing various elements by one; i.e., ring counter 2 would have only three flip-flops, inverter 3 would have only three elements, and decoder 4 would have only three NAND gates. Similarly, only three pulse-width modulators would be required.

Further, a two phase embodiment is realized by eliminating still one more of each of the recited elements. A five phase embodiment is realized by adding one element each to the entities of the four phase embodiment, and a six phase embodiment by adding two elements.

It is required that the control pulse width available at each of the output terminals, such as 40, be combined with a source of electric power so that such power at a level commensurate with the requirements of the plural phase loads will be supplied to each.

This requirement is met by the lamp drivers designated as 17-20 in FIG. 1; one of which is detailed in FIG. 3.

In FIG. 3, input terminal 40' is illustrative of the output from a pulse-width modulator, such as from terminal 40 in FIG. 2. This terminal is connected to a phase-inverting buffer amplifier 46, which may be of the MC946 type. This moderately increases the power level. The output therefrom passes through isolation resistor 47, having a resistance of approximately 5,000 ohms, and then to the base of transistor 48, which may be a 2N3053. This transistor increases the current level in the circuit. It is fed from power supply 22 through resistor 49, of approximately 1,000 ohms, which resistor is connected to the collector. The emitter is connected to ground.

The peak d.c. voltage allowable on the several lamps, as 9 in FIG. 1, is 28 volts.

Accordingly, the d.c. voltage output of power supply 22 is 30 volts. The power supply is typically the known full-wave semiconductor rectifier type employing a transformer that is connected to a 115 v. a.c. input and having an output capacitor filter of several microfarads capacitance.

The output of transistor 48, from the collector, passes through variable resistor 50, having a maximum resistance of the order of 1,000 ohms, and also, in series therewith, fixed resistor 51, having about 750 ohms resistance. The latter resistor is connected to the base of transistor 52, which is one of a Darlington pair. It may be the 2N3055 type. In the known manner the emitter of transistor 52 is connected to the base of the second Darlington transistor 53, a 2N3771, and the collectors of both transistors are connected to the output terminal of power supply 22. The base and emitter of transistor 53 are connected by resistor 54, having a resistance of 1,000 ohms.

Transistor 53, as specified, is capable of carrying a current of the order of 25 amperes maximum and the lamp load 9 is typically rated at about one-third of this current. Transistor 52 increases the effective beta of transistor 53, and so the signal power to drive the pair is minimal.

Essentially, the power supplied to load 9 by transistor 53 is in pulsed form, following the pulse duration set by the pulse-width modulator involved. If it is desired that the current through the load should be more nearly a direct current, capacitor 56 may be added in shunt to accomplish this. A capacitance of the order of 6,000 microfarads is suitable.

I claim:

1. The method of cyclically supplying regulated electric power to energy-related equivalent plural phase loads in a single entity at plural separate periods of time, which includes the method steps of;

(a) separately sensing the amplitude of electric power in each of said plural phase loads, (b) forming plural series of control pulses differently phase-related to occur individually at different times, (c) individually altering the duration of the pulses of each said series of control pulses to selectively regulate electric power according to the amplitude sensed, (d) separately supplying electric power in proportion to the duration of each said altered control pulse of said plural series to said plural phase loads, to provide regulated electric power to each of said plural phase loads, and (e) arranging said plural phase loads to have each contribute to a common level of energy that is supplied by said plural phase loads.

2. The method of claim 1, in which;

(a) the control pulses are formed with the leading edge of each equally spaced in time.

3. A plural phase power supply for individually supplying regulated electric power to plural phase loads, comprising;

(a) electric oscillatory means (1) for continuously producing successive cycles of electrical energy.

(b) phase-divider means (2) for producing plural series of pulses in separate circuits from said successive cycles of electrical energy, said phase-divider means electrically connected to said electric oscillatory means for actuation thereby, (c) Plural pulse-width modulator means (5-8) each connected in the circuit of a separate said plural phase load and to said phase-divider means to accept one of said series of plural pulses for altering the time duration of the pulses thereof, (d) plural control means (14-16) each connected to a said plural pulse-width modulator means to control the pulse width supplied by that pulse-width modulator in accordance with the output supplied by said control means, (e) driver means (17-20) individually connected to said pulse-width means to control the level of power regulated by said pulse-width modulator means, and (f) power supply means (22) individually connected to each said driver means to provide an electrical energy output thereto that is individually altered by each said pulse-width modulator means according to the control thereover exerted by the corresponding said control means.

4. The plural phase power supply of claim 3, in which said phase-divider means (2) comprises;

(a) ring-counter means ($FF_1$–$FF_4$) having plural states of electrical level, and (b) separate electrical circuits for providing electrical outputs at separate times.

5. The plural phase power supply of claim 4 which additionally includes;

(a) inverter means (3) to reverse the phase of the pulses in each separate circuit, connected to said ring-counter means, and (b) decoder means (4) connected to said inverter means to give an electrical output in each said separate electrical circuit upon a selected code being satisfied by pulses from said ring-counter means.

6. The plural phase power supply of claim 5, in which;

(a) the output of said ring-counter means (2) is connected in reverse polarity to the input thereof, and (b) said decoder means (4) through said inverter means (3) is connected to said ring-counter means to supply an output only on alternate said plural states of electrical level of said ring-counter means.

7. The plural phase power supply of claim 5, in which;

(a) said ring-counter means is comprised of a given plurality of bi-state elements ($FF_1$–$FF_4$) which give twice that plurality of code outputs, and (b) said decoder (4) is comprised of the same said given plurality of gates (32-35) which give the same said given plurality of outputs.

8. The plural phase power supply of claim 7, in which;

(a) said bi-state elements are flip-flops, and (b) said gates of said decoder are each two-input gates.

9. The plural phase power supply of claim 8, in which;

(a) each said gate of said decoder is a NAND gate.

10. The plural phase power supply of claim 3, in which;

(a) the number of said plural separate circuits is four.

11. The plural phase power supply of claim 3, in which each said pulse-width modulator means comprises;

(a) a chargeable circuit (25, 26), (b) means to initiate charge accumulation (555) by said chargeable circuit upon the receipt of a said successively-timed pulse, and (c) means to terminate charge accumulation (37) by said chargeable circuit upon the charge reaching an analog electrical value supplied by said control means (14).

12. The plural phase power supply of claim 3, in which;

(a) said electrical oscillatory means (1) provides a square wave of output electrical energy.

* * * * *